United States Patent [19]

Sakurai

[11] 4,388,661
[45] Jun. 14, 1983

[54] MULTICHANNEL MAGNETIC HEAD AND A MANUFACTURING METHOD THEREFOR

[75] Inventor: Yoshifumi Sakurai, Minoo, Japan

[73] Assignee: Olympus Optical Co., Ltd., Tokyo, Japan

[21] Appl. No.: 206,373

[22] Filed: Nov. 13, 1980

[30] Foreign Application Priority Data

Nov. 14, 1979 [JP] Japan .................. 54-147327

[51] Int. Cl.³ .................. G11B 5/38; G11B 5/28; G11B 5/22
[52] U.S. Cl. .................. 360/112; 360/121; 360/122; 29/603
[58] Field of Search .............. 360/112, 113, 122, 123, 360/124, 125, 126, 121

[56] References Cited

U.S. PATENT DOCUMENTS

| | | | |
|---|---|---|---|
| 3,643,035 | 2/1972 | Tsukagoshi | 360/112 |
| 3,686,751 | 8/1972 | Sugiyama | 360/112 |
| 3,701,861 | 10/1972 | Suzuki et al. | |
| 3,715,522 | 2/1973 | Tsukagoshi | |
| 3,943,570 | 3/1976 | Yamamoto et al. | 360/112 |
| 3,987,485 | 10/1976 | Sugaya et al. | 360/112 |
| 4,036,723 | 7/1977 | Schwartz | 360/113 |
| 4,155,106 | 5/1979 | Muraoka | |
| 4,179,719 | 12/1979 | Imamura et al. | 360/112 |
| 4,186,481 | 2/1980 | Noguchi | |
| 4,218,659 | 8/1980 | Arai | 360/112 |

FOREIGN PATENT DOCUMENTS 1102251  3/1961  Fed. Rep. of Germany .
12649  6/1980  France .
54-7317  1/1979  Japan .

OTHER PUBLICATIONS

IBM Tech. Disc. Bull., R. J. Gambino et al., Magnetic Films for Hall Effect Devices Usefull for Magnetic Recording Heads, vol. 18, No. 12, May 1976, pp. 4214-4217.
IBM Tech. Disc. Bull., R. J. Gambino et al., GdFe and GdCoFe Materials for Magnetic Head Hall Sensors, vol. 18, No. 12, May 1976, p. 4218.

Primary Examiner—Alfred H. Eddleman
Attorney, Agent, or Firm—Frishauf, Holtz, Goodman & Woodward

[57] ABSTRACT

A multichannel magnetic head has a Hall element which is disposed in a magnetic circuit which is traversed by a magnetic flux to be detected and which is used as magnetic/electric converting means. The Hall element comprises an amorphous magnetic thin film consisting of an alloy containing a rare earth element and a transition metal. To the amorphous magnetic thin film are connected a pair of current terminals and a plurality of Hall voltage terminals corresponding in number to the number of channels of the multichannel head, and the amorphous thin film is arranged in magnetic circuits of a plurality of channels.

4 Claims, 19 Drawing Figures

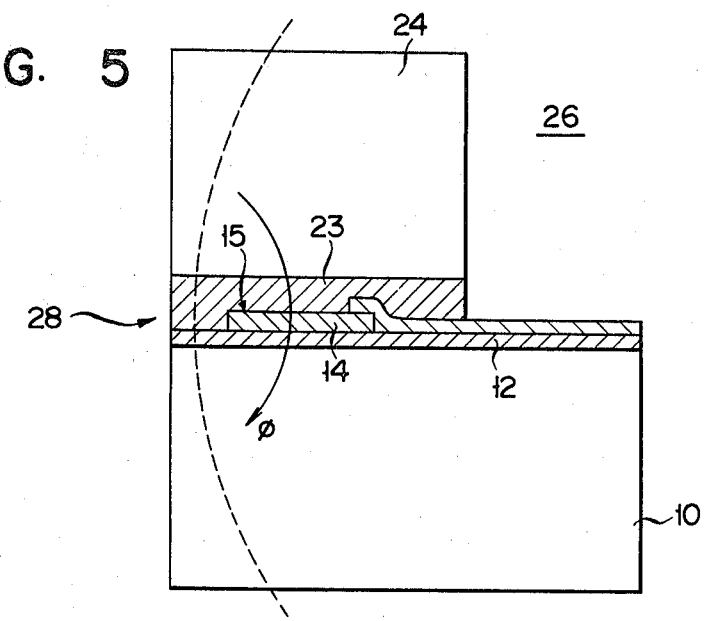
F I G. 5
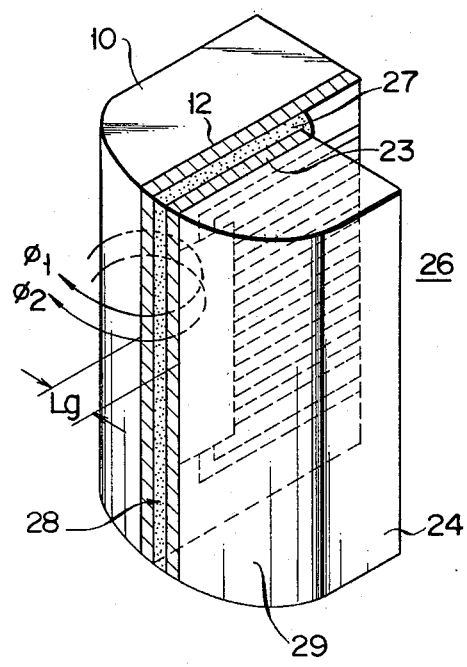
F I G. 6
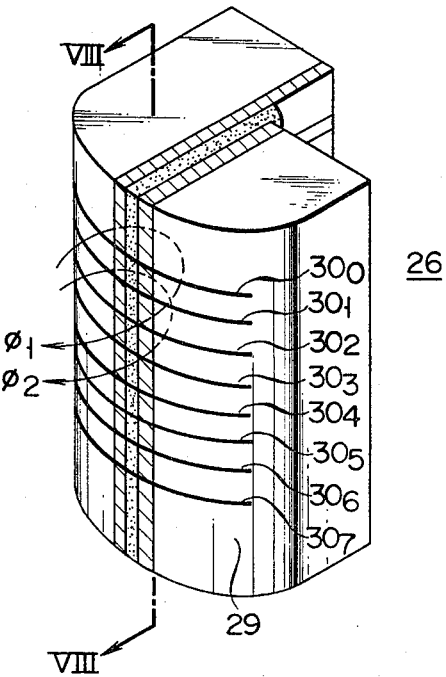
F I G. 7

F I G. 11
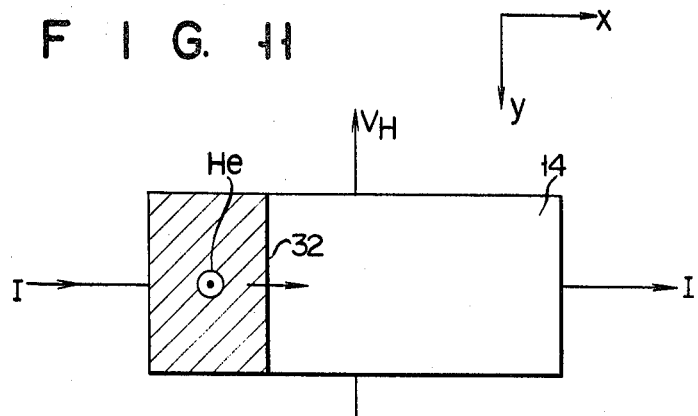
F I G. 12
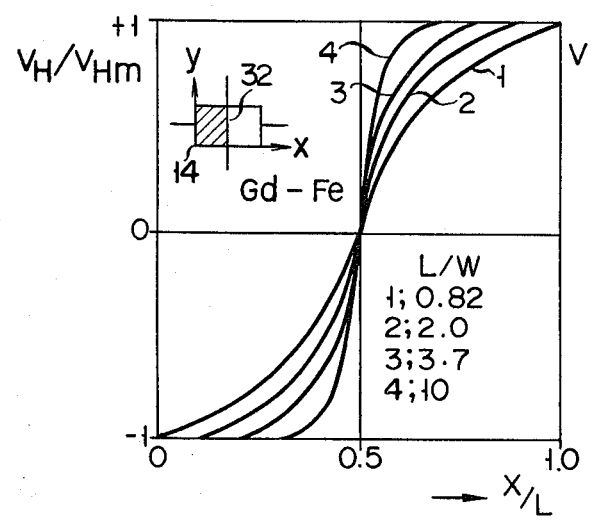
F I G. 13A
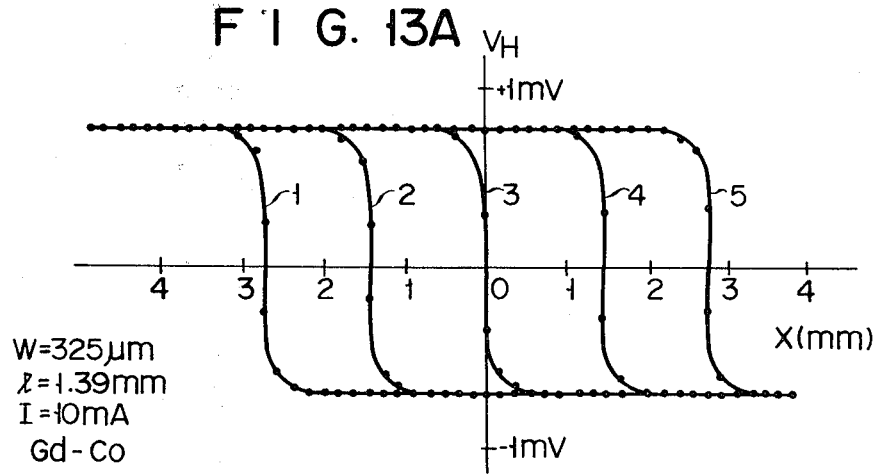

F I G. 13B
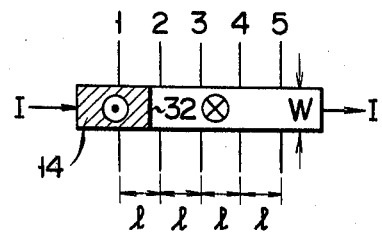
F I G. 14
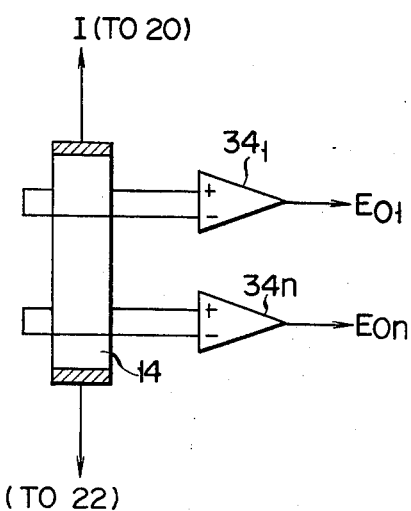
F I G. 15
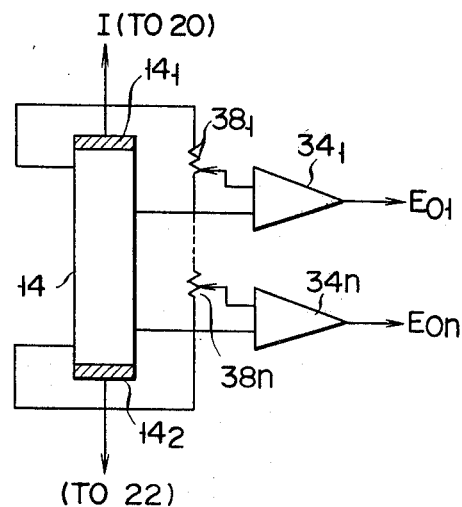
F I G. 16
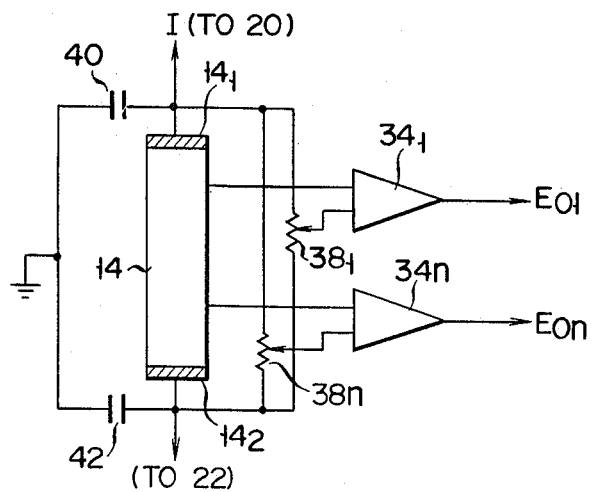

MULTICHANNEL MAGNETIC HEAD AND A MANUFACTURING METHOD THEREFOR

BACKGROUND OF THE INVENTION

This invention relates to a multichannel type magnetic head utilizing the Hall effect for magnetic/electric conversion, and a specific method for producing this magnetic head.

There are known two types of magnetic heads for detecting information recroded on magnetic recording media. One includes a high-permeability core with a winding wound thereon to form a magnetic flux circuit, while the other is composed of a semiconductor Hall element inserted in a front or back gap in the magnetic flux circuit. In the winding-type magnetic head, a reproduced output is proportional to the time-based changing rate $d\phi/dt$ of detected magnetic flux $\phi$. Therefore, the reproduced output is reduced as the frequency of the detected magnetic flux $\phi$ is lowered. Accordingly, it is impossible to detect magnetic flux subject to no time-based change. Since the winding-type head requires a winding space, the track intervals between channels cannot fully be narrowed in forming a multichannel-type head.

In the Hall-element type magnetic head, on the other hand, the reproduced output is proportional to the magnitude of the detected magnetic flux itself. Accordingly, if the frequency-based change of the magnitude of the magnetic flux flowing through the magnetic flux circuit is negligible, the substantial output level will hardly exhibit any dependence upon frequency. This means that a flat frequency characteristic can be obtained over a considerably wide frequency range from the DC region to the high-frequency region. Furthermore, the space occupied by the Hall element may be made extremely small so that the track intervals between channels may be sufficiently narrowed for constituting the multichannel head. Thus, the magnetized surface of the tape may be utilized efficiently, and the track density may be increased.

A multichannel head utilizing these characteristics of the Hall element is disclosed in Japanese Patent Disclosure No. 44,814/75. In the magnetic head disclosed in this application, independent Hall elements are used for separate channels in order to eliminate crosstalk between the channels. A current supply line and a signal output line are disposed for each of these Hall elements. Consequently, the number of external terminals of the head becomes too large to form a multichannel head with many channels. Furthermore, as may be seen from this specification, when a semiconductor Hall element of, for example, indium-antimonide (InSb) is used as the Hall element, it becomes difficult to obtain a high S/N ratio (signal to noise ratio) and good resolution (excellent high frequency response) simultaneously.

When disposing the Hall element at the front gap side, the gap width for detection of signals is greater than the thickness of the Hall element. It thus becomes necessary to use a thinner Hall element for narrowing the front gap to obtain a higher resolution. In a general Hall element using a semiconductor polycrystalline thin film, a typical example of which is indium-antimonide, the thinner the element becomes, the more the element is affected by the boundary regions of the polycrystals and the greater becomes the current noise. Thus, with the magnetic head which uses a thin semiconductor Hall element for obtaining higher resolution, more current noise tends to be generated and it is difficult to obtain a high S/N ratio.

This problem also applies to the case where the semiconductor Hall element is disposed in the back gap. In this case, although the thickness of the Hall element does not directly affect the reproduction resolution, it indirectly affects the reproduction resolution from the viewpoint of reproduction efficiency. However, the narrower the front gap, the lower the reluctance of the front gap and hence the reproduction efficiency will be deteriorated. Such effect is produced because most of the detected magnetic flux is shunted at the front gap section with the low reluctance to reduce the magnitude of the magnetic flux transmitted to the Hall element in the back gap. When narrowing the front gap to improve the frequency characteristic (resolution) of the magnetic head as a whole, therefore, it is essential to provide an efficient magnetic flux circuit. Namely, the reluctance of the magnetic flux circuit including the back gap with the Hall element inserted therein needs to be low enough.

The most effective method for lowering the reluctance of the magnetic flux circuit is to narrow the back gap. The permeability of the semiconductor Hall element is much lower than that of the high-permeability ferromagnetic substance forming the magnetic flux circuit. Accordingly, the reluctance of the magnetic flux circuit can greatly be lowered by reducing the width of the back gap even by a very small margin in microns. This implies that the thickness of the Hall element must be reduced. Then, similar problems arise as in the case wherein the Hall element is disposed in the front gap. Namely, when the front gap is narrowed for obtaining a higher resolution and the back gap is narrowed to compensate for the resultant degradation in the reproduction efficiency, the Hall element must be made thinner and the current noise increases.

The present invention has been made to overcome these problems of the prior art and has for its object to provide a multichannel magnetic head and a manufacturing method therefor, wherein the number of external terminals is smaller, and the resolution, S/N ratio and track density are improved.

SUMMARY OF THE INVENTION

To the above and other ends, the present invention provides a multichannel magnetic head wherein an amorphous magnetic thin film of an alloy containing a rare earth element and a transition metal is used as a Hall element to be used as a magnetic/electric conversion element; pairs of current terminals and Hall voltage terminals corresponding in number to the number of channels of the head are connected to the amorphous magnetic thin film; and this amorphous thin film is arranged in magnetic circuits of a plurality of channels.

With the magnetic head of such a construction, the thin film Hall element adopted for the plurality of channels may be biased with only a pair of current terminals. Thus, the number of current terminals may be vastly decreased as compared with a conventional multichannel Hall element head in which an individual Hall element is disposed for each channel for individually biasing the channels. Furthermore, since the amorphous thin film uses a rare earth/transition metal such as gadolinium.cobalt (GdCo) or gadolinium.iron (GdFe), the magnetic/electric conversion efficiency is high due to the anomalous Hall effect, and current noise due to the boundary regions of the polycrystal is eliminated. Consequently, a high sensitivity and a high S/N ratio may be obtained even when the front gap of the magnetic head is narrowed, or even when the thickness is reduced for obtaining higher resolution. Furthermore, since a single thin film Hall element is capable of signal detection of a plurality of channels, the track intervals may be sufficiently narrowed.

According to the present invention, it is, therefore, possible to provide a multichannel magnetic head in which the number of external terminals is small, and a higher resolution, a higher S/N ratio and a higher track density are obtained.

This invention can be more fully understood from the following detailed description when taken in conjunction with the accompanying drawings.

BRIEF DESCRIPTION OF THE DRAWINGS

FIG. 5 is a sectional view illustrating a modification of FIG. 4 according to which the second insulating layer is formed directly on the Hall element surface and the second ferromagnetic block is superposed thereon;

FIG. 6 is a perspective view illustrating the manner in which the front side gap is curvedly ground after joining the first and second ferromagnetic blocks in FIG. 3;

FIG. 7 is a modification of FIG. 6 according to which grooves of high reluctance are formed between adjacent magnetic circuits of the plurality of channels;

FIGS. 10 and 11 are views for explaining the domain wall motion in the Hall element film of the magnetic head shown in FIG. 6 or 7;

FIG. 12 is a graph illustrating the relation between the position of the domain wall shown in FIG. 11 and the Hall output;

FIGS. 13A and 13B are graphs illustrating the relation between the domain walls at each of the Hall voltage terminals and the Hall output voltage;

FIGS. 14 through 17 are circuit diagrams illustrating the means for obtaining the signal from each channel of the Hall element shown in FIGS. 6 and 7.

DETAILED DESCRIPTION

Preferred embodiments of the present invention will be described referring to the accompanying drawings. In order to avoid redundancy, the same numerals denote similar parts in different drawings for simplification of the description.

Figure 1:
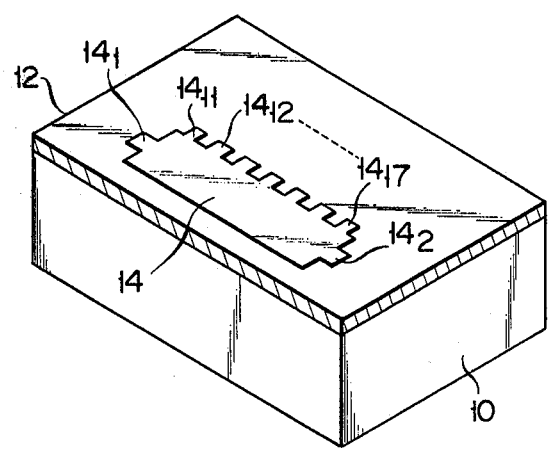
FIG. 1 is a perspective view illustrating the manner according to which an amorphous thin film Hall element according to one embodiment of the present invention is formed on a first insulating layer of a first ferromagnetic block.

FIG. 1 shows a Hall element section of the magnetic head according to this invention. A thin-film insulating layer 12 with a thickness of approximately 2,000 Å is formed on a ferromagnetic substrate 10 forming a first core half. This formation is made by evaporating or sputtering $SiO_2$ or other material onto an Mn-Zn ferrite block whose surface is ground to be optically flat, for example. An amorphous magnetic thin film 14 of Gd-Co or Gd-Fe is stuck on the insulating layer 12 by vacuum evaporation or RF sputtering. The thickness of the amorphous thin film 14 formed in this manner is set within a range from approximately 2,000 to 10,000 Å (0.2 to 1.0 $\mu$m), for example. The atomic percentage of rare-earth element such as gadolinium Gd used for the thin film 14 is set at a suitable value less than approximately 40%. This range of atomic percentage is so selected that the thin film 14 has an axis of easy magnetization in the direction normal to the film surface, i.e., it has magnetic anisotropy. Such a range of the atomic percentage is generally 10–40%. This thin film 14 is formed in a predetermined shape as shown in FIG. 1 by methods such as photoetching. This photoetching determines the positions of current terminals $14_1$ and $14_2$ and Hall voltage terminals $14_{11}$ to $14_{17}$.

Figure 2:
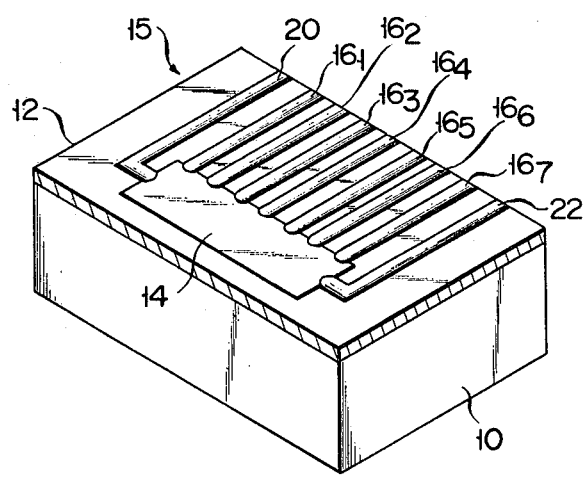
FIG. 2 is a perspective view illustrating the manner according to which a pair of current terminal patterns and voltage terminal patterns for each channel are formed on the Hall element of FIG. 1.

On the terminals $14_1$, $14_2$, and $14_{11}$ to $14_{17}$ are formed voltage terminal patterns $16_1$ to $16_7$ and current terminal patterns 20 and 22 of aluminum or copper as shown in FIG. 2. Vacuum evaporation or sputtering is used also for the formation of these terminal patterns. The terminal patterns are formed into given shapes by photoetching, etc. Thus, an amorphous thin-film Hall element 15 is completed.

Figure 3:
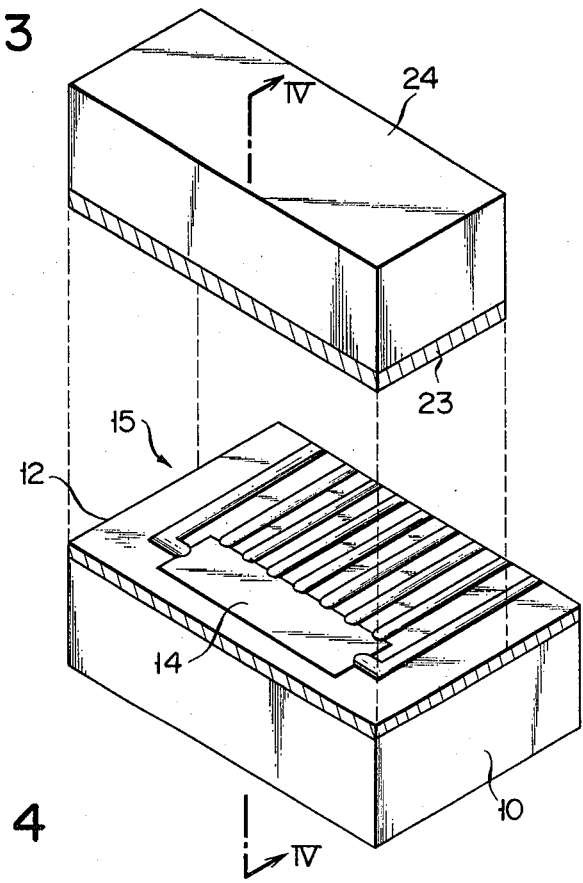
FIG. 3 is a perspective view illustrating the manner according to which a second insulating layer of a second ferromagnetic block is superposed on the Hall element formed surface of FIG. 2.
Figure 4:
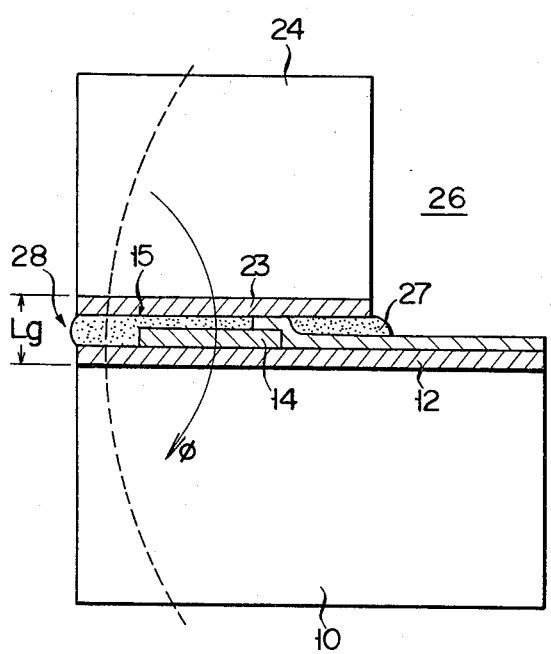
FIG. 4 is a sectional view along the line IV—IV of FIG. 3 after the first and second ferromagnetic blocks are joined.

Then, as shown in FIG. 3, a ferromagnetic block 24 forming a second core half is coupled with the ferromagnetic substrate 10 so as to hold the thin-film Hall element 15 therebetween across an insulating layer 23 of $SiO_2$ or other material. The insulating layer 23 is formed on the block 24 in advance by a method such as sputtering. The coupling is made by pressure-holding or adhesive-bonding. FIG. 4 shows the block 10 adhered to the block 24 with glass 27 of low melting point. A head block 26 completed in this manner is housed in a shield case (not shown), and fixed by epoxy resins, etc. Prior to such resin fixation, the terminal patterns $16_1$ to $16_7$, 20 and 22 are connected to external terminals (not shown). Core surfaces including a gap 28 to come in slidable contact with recording media such as magnetic tapes are curvedly ground in a curved shape as indicated by a broken line in FIG. 4.

In the resultant magnetic head, the magnetic flux path length of a magnetic flux circuit consisting of the ferromagnetic blocks 10 and 24 with the thin-film Hall element 15 therebetween is short. Therefore, magnetic flux $\phi$ detected by the gap 28 can pass through the thin film 14 with high efficiency. This is quite advantageous to the improvement of the S/N ratio. Also, the amorphousness of the thin film 14 greatly contributes to the improvement of the S/N ratio of the magnetic head according to this invention. Since the current noise due to the boundary regions of crystals can be removed with the amorphous thin-film Hall element, the magnetic head will suffer little noise even if the film thickness is reduced. According to an experiment, an S/N ratio of approximately 50 dB was obtained with use of a film thickness of thousands of angstroms (e.g. approximately 2,000 to 3,000 Å). Accordingly, the width of the front gap 28 can be reduced by making the insulating layers 12 and 23 sufficiently thin, below 1 μm, even though the thin-film Hall element 15 is inserted in the gap 28 as shown in FIG. 4. Thus, there may be obtained a magnetic head with high resolution and good S/N ratio.

FIG. 5 shows a modification of FIG. 4. In this figure, the insulating layer 23 is formed on the Hall element 15 shown in FIG. 2, and the block 24 is coupled thereover. The coupling of the block 24 may be effected by pressure-holding or adhesive-bonding. The mechanical coupled strength of the block 24 becomes sufficient even in the case of pressure-holding, since the head block 26 is later fixed with an epoxy resin or the like.

FIG. 6 is a perspective view illustrating the side surface of the front gap 28 after curvedly grinding the part indicated by the broken line in FIG. 4, i.e., a contact surface 29 for slidable contact with a magnetic tape. In this embodiment, magnetic circuits for respective channels are not independent of one another. Therefore, crosstalk is generated between the channels due to coupling between the magnetic circuits. However, this crosstalk may be prevented by electrical means. (The electrical means for eliminating the crosstalk will be described with reference to FIG. 18 hereinafter). However, it is preferable that the crosstalk due to the magnetic coupling be slight. For this reason, it is preferable to use ferromagnetic materials of significant magnetic anisotropy in the direction of the stream of the magnetic fluxes $\phi_1$ and $\phi_2$ for the blocks 10 and 24. However, this does not limit the use of isotropic ferromagnetic materials for the blocks 10 and 24.

Figure 8:
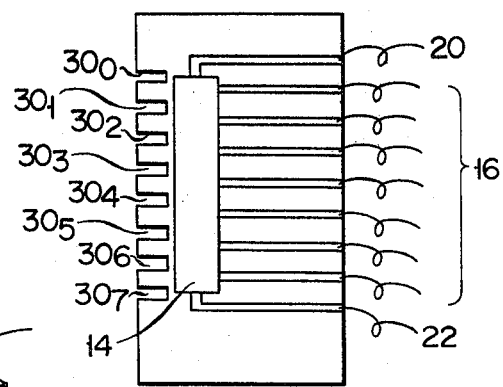
FIG. 8 is a sectional view along the line VIII—VIII of FIG. 7.

FIG. 7 shows a modification of FIG. 6. In this example, the magnetic circuits for the respective tracks are separated from each other for reducing crosstalk between the channels which is caused by coupling of the magnetic circuits. Grooves $30_0$-$30_7$ are formed in the slidable contact surface 29 toward the inside of the head block 26. FIG. 8 is a sectional view along the line VIII—VIII of the head block 26 of FIG. 7. It particularly illustrates the shapes of the grooves $30_0$-$30_7$. The grooves $30_0$-$30_7$ provide great reluctance between the adjacent magnetic circuits of the plurality of channels. By the high reluctance of these grooves 30, the crosstalk which is generally caused by the magnetic coupling is reduced.

Figure 9:
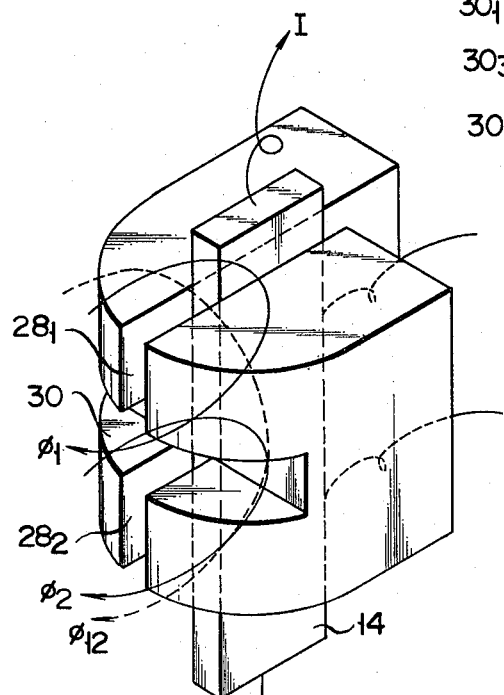
FIG. 9 is a perspective view illustrating a simplified model for explaining the stream of the magnetic flux in the magnetic circuits of the construction shown in FIGS. 7 and 8.

FIG. 9 shows a simplified model for explaining the stream of the magnetic flux in the magnetic circuit of the construction shown in FIGS. 7 and 8. The main streams of the magnetic flux $\phi_1$ detected at the gap $28_1$ of the first channel and the magnetic flux $\phi_2$ detected at the gap $28_2$ of the second channel follow the shortest flux path parallel to the grooves 30. In this case, the magnetic fluxes $\phi_1$ and $\phi_2$ pass substantially perpendicularly to the surface of the predetermined part of the thin film 14. The magnetic flux $\phi_{12}$ detected at the gaps $28_1$ and $28_2$ and constituting the crosstalk component passes obliquely to the surface of the thin film 14 along a longer magnetic path than that of the magnetic fluxes $\phi_1$ and $\phi_2$. The region of the surface of the thin film 14 where the flux density of the magnetic flux $\phi_{12}$ is highest is shifted from the regions where the flux densities of the magnetic fluxes $\phi_1$ and $\phi_2$ are highest. The maximum magnetic flux density region of the flux $\phi_{12}$ is between the maximum density region of the flux $\phi_1$ and the maximum density region of the flux $\phi_2$. Thus, when the thin film 14 has vertical magnetic anisotropy and the Hall sensitivity of the maximum flux density region of the magnetic flux $\phi_{12}$ is particularly low, the crosstalk between the channels is effectively reduced.

Figure 10:
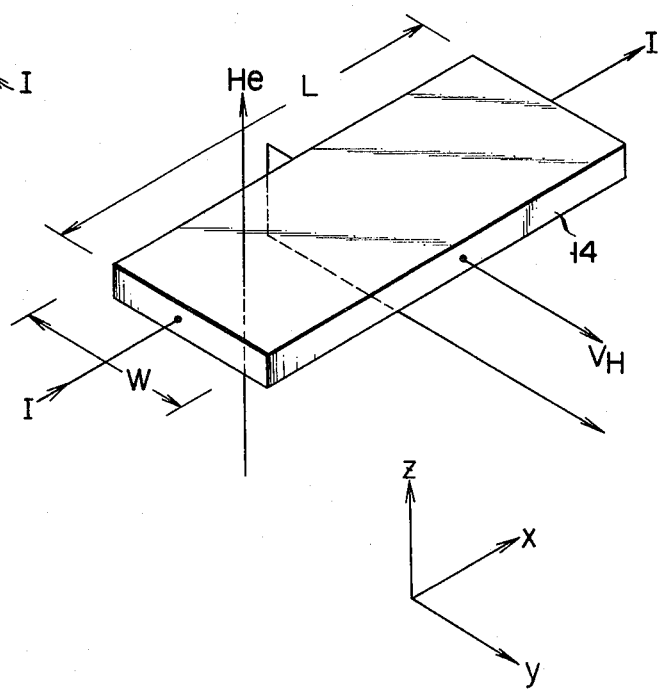

FIGS. 10 and 11 show simplified models for explaining the domain wall motion within the thin film 14. The length of the thin film 14 in the x-direction of the biasing current I is designated by L, the width of the thin film 14 in the y-direction of the Hall voltage VH is designated by W. The external magnetic field applied in the z-direction vertical to the surface of the thin film 14 is designated by He. It is assumed that the thin film 14 consists of a number of subsections which are spontaneously magnetized in particular directions. When the magnetic field He is applied at a predetermined position of the thin film 14, domain wall 32 moves as shown in FIG. 11, and the spontaneous magnetization of one subsection in its particular direction magnetizes the other subsections in their particular directions, and the magnetization spreads. When the magnetic field becomes very strong, the whole film becomes one section and is saturated. Thus, the magnetization within the thin film 14 may be explained mainly by the motion of the domain wall 32.

FIG. 12 is a graph showing the relation of the position of the domain wall 32 and the Hall output. The ratio VH/VHM of the Hall voltage VH to the maximum Hall voltage VHM is plotted along the ordinate, and the position x/L of the domain wall 32 normalized to the length L of the thin film 14 is plotted along the abscissa. Parameters 1 to 4 denote the ratio L/W of the length L to the width W of the thin film 14. The Hall voltage output terminal is at the position L/2. The material for the thin film 14 is a GdFe alloy. It is seen from the figure that VH=VHM with the parameter 1 (L/W=0.82) when x/L=1 or x=L. With the parameter 4 (L/W=10), VH=VHM before x/L becomes 1 and saturation occurs. When a case is considered wherein the domain wall 32 is moved from the left to the right, the Hall sensitivity $\partial$VH/$\partial$He becomes substantially zero when the domain wall 32 is at the left end (x/L=1) of the thin film 14. The Hall sensitivity $\partial$VH/$\partial$He becomes maximum when the domain wall 32 is at the central portion (x/L=0.5), that is, when the domain wall 32 is at the position of the Hall voltage output terminal.

FIGS. 13A and 13B show the relation of the Hall voltage VH and the position x of the domain wall 32 when five pairs of Hall voltage output terminals are included. In these figures, the distance between the Hall voltage output terminals is represented by l. The width of the thin film 14 is W, and l/W is selected to be about 4.3. Although GdCo is used as the material of the thin film 14, GdFe may alternatively be used. As may be apparent from the description with reference to FIG. 12, the maximum Hall voltage (saturation Hall voltage) VHM is obtained when the position of the domain wall 32 is at a distance l/2 from a Hall voltage output terminal. When a Hall voltage output terminal is separated by over l/2 or 2W from the Hall voltage output terminal, VH=VHM and the Hall sensitivity ($\partial$VHM/$\partial$He) becomes substantially zero due to the domain wall. Thus, it is possible to prevent overlapping of the magnetically sensitive regions at respective Hall voltage output terminals by making the Hall voltage output terminal interval l greater than 4W. Thus, it becomes possible to eliminate the crosstalk which is generally generated inside the thin film 14 and to independently obtain a plurality of pieces of information (e.g., the magnetic fluxes $\phi_1$ and $\phi_2$) with a single Hall element thin film 14.

FIGS. 14 to 17 show circuit diagrams for obtaining the magnetic/electric converted signals for respective channels of the thin film 14 shown in FIG. 6 or 7. In FIG. 14, a pair of the voltage output terminals of the respective channels of the thin film 14 are connected to both input terminals (+, −) of amplifiers $34_1$-$34_n$. These amplifiers $34_1$-$34_n$ are used as balanced input type amplifiers (differential amplifiers).

In FIG. 15, voltage output terminals at one side of the respective channels of the thin film 14 are connected to the inverted input terminals (or non-inverted input terminals) of the amplifiers $34_1$-$34_n$, respectively. The non-inverted input terminals of the amplifiers $34_1$-$34_n$ are connected to the sliders of variable resistors $38_1$-$38_n$, respectively. The variable resistors $38_1$-$38_n$ are connected in series with each other, and the two ends of the series-connected variable resistors are connected to the two sides of the thin film 14 in its longitudinal direction (in the direction of flow of the current I). Alternatively, the resistors $38_1$-$38_n$ may be directly connected to both current terminals $14_1$ and $14_2$. The variable resistors $38_1$-$38_n$ are used for offset balancing of the amplifiers $34_1$-$34_n$.

In FIG. 16, the variable resistors $38_1$-$38_n$ for offset balancing are connected in parallel with each other. The current terminals $14_1$ and $14_2$ of the thin film 14 are by-passed to a ground circuit through capacitors 40 and 42. The capacitors 40 and 42 reduce the impedance at the current terminals $14_1$ and $14_2$.

Figure 17:
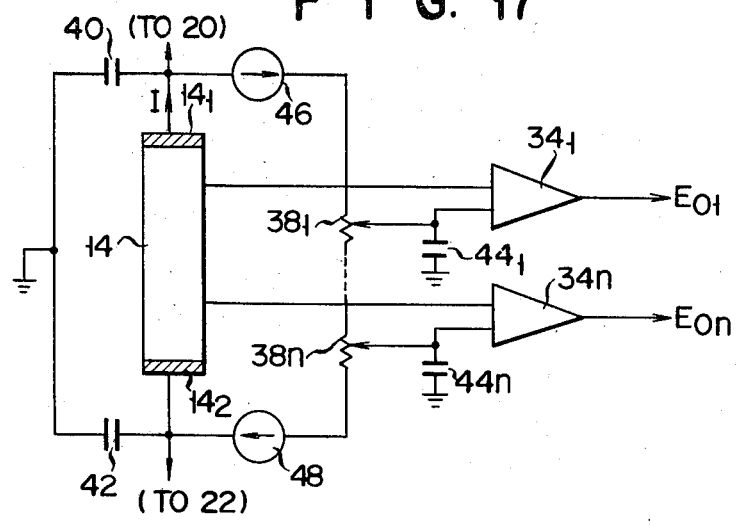

In FIG. 17, current sources 46 and 48 are respectively inserted between the current terminals $14_1$ and $14_2$ of the thin film 14 and the two ends of the series-connected variable resistors $38_1$-$38_n$. Only one of the current sources 46 and 48 may be used. The sliders of the variable resistors $38_1$-$38_n$ are grounded through capacitors $44_1$-$44_n$. By these capacitors $44_1$-$44_n$, noise and other unnecessary signal components are shunted which are normally supplied from the slider side of the variable resistors 38 to the amplifiers 34.

Figure 18:
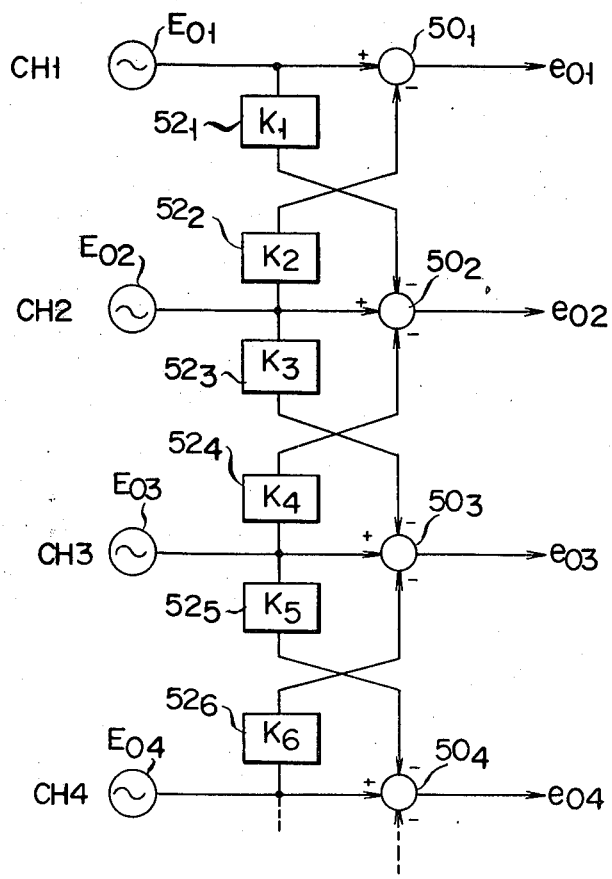
FIG. 18 is a circuit diagram illustrating the means for electrically eliminating crosstalk between the channels.

FIG. 18 shows a circuit for electrically eliminating the crosstalk generated between the channels in the magnetic head shown in FIG. 6 or 7. The signals detected at the Hall voltage terminal corresponding to the first channel of the thin film 14 are amplified by the amplifier $34_1$ as shown in FIGS. 14 to 17. An output voltage E01 of the amplifier $34_1$ is supplied to the positive-phase input terminal of a mixer $50_1$ as well as to the negative-phase input terminal of a mixer $50_2$ through an attenuator $52_1$ of attenuation ratio K1. Similarly, an output voltage E02 is supplied to the positive-phase input terminal of the mixer $50_2$ as well as to the negative-phase input terminals of mixers $50_1$ and $50_3$ through attenuators $52_2$ and $52_3$, respectively. The same applies to an output voltage E03 and so on.

It is now assumed that the output voltage E02 of the second channel is represented by the following equation:

$$E02 = \overline{E02} + K1E01 + K4E03 \quad (1)$$

wherein $\overline{E02}$ represents signal components of the second channel with no crosstalk components, and K1E01 and K4E03 represent the crosstalk components leaked from the first channel and the third channel to the second channel, respectively. In the mixer $50_2$, K1E01 and K4E03 are (negative-phase) composed with E02 of equation (1). Thus, the signal components of the second channel signal e02 outputted from the mixer $50_2$ become only $\overline{E02}$. The complete elimination of the crosstalk components from the signal e02 is performed by adjusting the attenuation ratios K1 and K4 of the attenuators $52_1$ and $52_4$. When a constant phase difference is present between the output voltages E01, E02 and E03, it is preferable to insert a variable phase shift type phase shifter in series with the attenuator 52. This is because the crosstalk components may not be removed from the signal e02 by the adjustment of the attenuator 52 when the phase difference between E01 and E03 is great.

Although an illustrative embodiment of this invention has been described in detail herein with reference to the accompanying drawings, it is to be understood that the invention is not limited to such precise embodiment, and that various changes and modifications may be effected therein by one skilled in the art without departing from the scope or spirit of the invention. For example, permalloy, Sendust, or a combination of these materials may be used for the ferromagnetic blocks 10 and 24 instead of using ferromagnetic ferrite. The material of the thin film 14 is not necessarily limited to GdCo or GdFe.

For the thin film 14, an amorphous thin film of a gadolinium.cobalt (GdCo) alloy whose gadolinium atomic percentage is about 15–20% or 24–30%. Since the GdCo thin film of this composition is amorphous, the current noise generally caused by the boundary regions of the polycrystals is not substantially generated. Furthermore, since the film has an axis of easy magnetization perpendicular to the film surface, a magnetic circuit with high magnetic/electric conversion efficiency may be designed. The amorphous GdCo thin film also causes less current noise and provides a relatively great output voltage by the anomalous Hall effect.

The above-mentioned composition ranges of 15–20% and 24–30% are preferably about 18–20% and 24–26%. These are more preferably set to be about 20% and about 24%, respectively.

A magnetic head of high S/N ratio and high sensitivity may be obtained in this manner. The GdCo thin film of the above-mentioned composition shows linear magnetic/electric conversion characteristics with substantially no hysteresis in an operative temperature range of −20° C. to +60° C. These linear conversion characteristics are preferable for analog signal reproduction such as audio signals. Since the GdCo alloy constituting the magnetic/electric conversion element is a thin film Hall element, flat frequency characteristic may be obtained from the DC region to higher frequency regions. From the above, it is seen that the magnetic head of the present invention has an excellent S/N ratio and frequency characteristics.

It is to be noted that the 15 to 20 and 24 to 30 atomic % of gadolinium as mentioned above is the composition formulation actually determined by X-ray diffractiometry or the like. Thus, this does not mean the target composition formulation is 15 to 20 and 24 to 30 atomic % of gadolinium for forming a thin film by sputtering. The composition of the thin film obtained by sputtering changes, depending upon the sputtering conditions, e.g. the atmospheric pressure and the discharging current. It is, therefore, impossible to know the composition of the obtained film from the composition of the target.

As the thin film 14, an amorphous thin film may be adopted which consists of gadolinium.cobalt alloy of about 76 to 78 atomic % of cobalt. Since the GdCo thin film of this composition is also amorphous, current noise due to the boundary regions of polycrystals is not substantially generated. Further, since it has an axis of easy magnetization in a direction normal to the surface of the thin film, a magnetic circuit which is high in magnetic/electric conversion efficiency may be designed. Therefore, a magnetic head of high S/N ratio and high sensitivity may be obtained. Furthermore, the GdCo thin film of the above composition has rectangular hysteresis characteristics in the operative temperature range of −20° to +60° C. Although these rectangular hysteresis characteristics are unsuitable for reproduction of analog signals such as audio signals, they are suitable for reproduction of FM signals and digital signals. This is because the output level of the element having rectangular hysterisis is hardly affected by interfering noises. Further, since the GdCo thin film constituting the magnetic/electric conversion element is a thin film Hall element, it is possible to obtain flat frequency characteristics from the DC to a considerably high frequency range.

It is to be understood that "multichannel" in the title of the invention and the scope of the claims includes the case of two channels.

What is claimed is:

1. A multichannel magnetic head means comprising:
    magnetic circuit means including a gap for detecting a magnetic flux ($\phi$), for leading said magnetic flux;
    an amorphous magnetic thin film held in said gap and consisting essentially of an alloy containing a rare earth element and a transition metal, said amorphous magnetic film having a single pair of current terminals and a plurality of spaced apart Hall voltage terminals;
    current leading means connected to said pair of current terminals, for leading a biasing current of said thin film along said gap; and
    voltage outputting means connected to said Hall voltage terminals, for outputting a Hall voltage for each channel corresponding to said magnetic flux, said voltage outputting means corresponding in number to the number of channels of the magnetic head and connected in a direction along the flow of said biasing current with a predetermined distance;
    said amorphous magnetic thin film being arranged such that its film surface is substantially normal to the direction of traverse of the magnetic flux to be detected, and the composition ratio of said rare earth element is selected to be within a range of about 10 to 40 atomic % so that said amorphous magnetic thin film has a magnetic anisotropy in a direction normal to the surface thereof; and
    the spacing between adjacent ones of said Hall voltage terminals being more than about four times the width of said amorphous magnetic thin film so that crosstalk between channels due to domain wall motion is substantially eliminated.

2. The multichannel magnetic head means of claim 1, further comprising a plurality of high reluctance parts disposed between a plurality of adjacent channels of the magnetic circuit means of the magnetic head except where said amorphous magnetic thin film is formed, for reducing crosstalk generated between the channels of the magnetic head through said magnetic circuit means.

3. The multichannel magnetic head means of claim 1, further comprising crosstalk cancelling means coupled to said Hall voltage terminals for composing with antiphase relative output voltages obtained from adjacent Hall voltage terminals for reducing crosstalk between adjacent channels.

4. The multichannel magnetic head means of any one of claims 1, 2 or 3, wherein said voltage outputting means includes a plurality of amplifiers respectively coupled to respective ones of said Hall voltage terminals, each of said amplifiers having a signal input terminal to which is inputted a Hall voltage signal corresponding to said magnetic flux, and an offset bias input terminal to which is supplied a DC potential which is substantially the same as that across said signal input terminal; and
    means for supplying an offset bias potential so that said DC potential supplied to said offset bias input terminal of said amplifiers is a predetermined potential between a potential of one of said pair of current terminal and the other thereof.

* * * * *